United States Patent
Sun et al.

(10) Patent No.: US 8,993,017 B2
(45) Date of Patent: Mar. 31, 2015

(54) ANIMAL FEED COMPOSITIONS AND PROCESSES FOR PRODUCING

(75) Inventors: Xiuzhi Susan Sun, Manhattan, KS (US); Jihong Li, Manhattan, KS (US); Pavinee Chinachoti, Topeka, KS (US); Luis J. Montelongo, Lawrence, KS (US)

(73) Assignees: Hill's Pet Nutrition, Inc., Topeka, KS (US); Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 13/516,297

(22) PCT Filed: Dec. 18, 2009

(86) PCT No.: PCT/US2009/068702
§ 371 (c)(1),
(2), (4) Date: Jun. 15, 2012

(87) PCT Pub. No.: WO2011/075140
PCT Pub. Date: Jun. 23, 2011

(65) Prior Publication Data
US 2012/0258201 A1    Oct. 11, 2012

(51) Int. Cl.
| | | |
|---|---|---|
| A23L 1/28 | (2006.01) | |
| A23C 9/12 | (2006.01) | |
| A23B 4/03 | (2006.01) | |
| A23B 4/044 | (2006.01) | |
| C12C 3/02 | (2006.01) | |
| A23L 1/10 | (2006.01) | |
| B02C 23/08 | (2006.01) | |
| A01J 25/00 | (2006.01) | |
| A47J 39/00 | (2006.01) | |
| A23K 1/00 | (2006.01) | |
| A23K 1/16 | (2006.01) | |
| A23K 1/18 | (2006.01) | |

(52) U.S. Cl.
CPC .............. *A23K 1/003* (2013.01); *A23K 1/1643* (2013.01); *A23K 1/1853* (2013.01)
USPC ............. 426/61; 426/519; 426/520; 426/618; 426/443; 426/462

(58) Field of Classification Search
None
See application file for complete search history.

(56) References Cited

U.S. PATENT DOCUMENTS

| | | | |
|---|---|---|---|
| 3,862,336 A | 1/1975 | Kofsky et al. | |
| 3,993,746 A | 11/1976 | Amen et al. | |
| 4,865,852 A | 9/1989 | Tamatani et al. | |
| 5,211,976 A | 5/1993 | Cox et al. | |
| 5,871,802 A | 2/1999 | Gao et al. | |
| 5,968,569 A | 10/1999 | Cavadini et al. | |
| 6,837,682 B2 | 1/2005 | Evenson et al. | |
| 2003/0072821 A1 | 4/2003 | Morre et al. | |
| 2004/0043113 A1 | 3/2004 | Stein Von Kamienski et al. | |
| 2005/0064073 A1 | 3/2005 | Paluch et al. | |

FOREIGN PATENT DOCUMENTS

| | | |
|---|---|---|
| CA | 1021625 | 11/1977 |
| CN | 1638649 | 7/2005 |
| CN | 1774324 | 5/2006 |
| CN | 101156646 | 4/2008 |
| CN | 101190002 | 6/2008 |
| CN | 101316519 | 12/2008 |
| EP | 0128934 | 12/1984 |
| EP | 0159891 | 10/1985 |
| EP | 0862863 | 9/1998 |
| JP | 57-033543 A | 2/1982 |
| JP | 2003-250464 | 9/2003 |
| RU | 2338388 | 11/2008 |
| WO | WO 84/02255 | 6/1984 |
| WO | WO 8402255 A2 * | 6/1984 |
| WO | WO 92/12639 | 8/1992 |
| WO | WO 9930570 A1 * | 6/1999 |
| WO | WO 03/059085 | 7/2003 |
| WO | WO 2004/091888 | 10/2004 |
| WO | WO 2007/041581 | 4/2007 |

OTHER PUBLICATIONS

Mammarella et al., "Evaluation of Stress-Strain for Characterization of the Rheological Behavior of Alginate and Carrageenan Gels". Brazilian Journal of Chemical Engineering. vol. 91, No. 01 pp. 403-409. (2002).*
Case et al., 1995, Canine and Feline Nutrition, Ch 14, "History and Regulation of Pet Foods", pp. 145-152.
PCT/US2009/068702—ISR and Written Opinion mailed Aug. 10, 2010.
Van Loo et al., "On the Presence of Inulin and Oligofructose as Natural Ingredients in the Western Diet", CRC Critical Reviews in Food Science and Nutrition, 35(6):525-552.
Wysong Corp., 1993, copy of product packaging bag, "Vitality Feline Diet", 4 lb. bag.
Wysong Corp., 1995, "Pet Foods and Pet Food Supplements", copy of excerpts from pet food product brochure.
Wysong Medical Corp., 1991, Submission of information on pet food products filed with Div of Regulatory Services, State of Kentucky.
Wysong, 1985, "Rationale for Nature's Choice", (brochure/catalog).
Wysong, 1993, "Rationale for Animal Nutrition", First Edition, Inquiry Press, Midland MI.

* cited by examiner

*Primary Examiner* — Rena L Dye
*Assistant Examiner* — Assaf Zilbering
(74) *Attorney, Agent, or Firm* — Thomas M. Hunter

(57) ABSTRACT

The present invention relates to animal food products and methods of producing thereof. The methods of the present invention comprise mixing a binding agent with feed meal at a temperature of between about 10° C. and about 70° C. to produce a mash, passing the mash through an extruder to form an animal feed product, and drying the animal feed product. In certain embodiments, the temperature of the meal, mash and final product is kept at 70° C. or below.

17 Claims, No Drawings

ANIMAL FEED COMPOSITIONS AND PROCESSES FOR PRODUCING

CROSS-REFERENCE TO RELATED APPLICATIONS

This application is a national stage entry under 35 U.S.C. §371 of International Patent Application No. PCT/US2009/068702, filed 18 Dec. 2009, which is incorporated herein by reference.

BACKGROUND OF THE INVENTION

Pelleting was introduced into the United States feed industry in the mid-1920's to improve feed utilization, increase the density of the feed and improve handling characteristics. Prior to about 1930 several different types of pelleting machines were utilized. Toward the end of the 1920's the flat die pelleting machine and ring die pellet mill were initially developed. While the flat die machine is still in use in certain applications, the ring die pellet mill quickly became the preferred design and was quickly adopted by the animal feed industry and remains the form of pelleting machine of choice today. In addition to the ring die pellet mill itself, auxiliary equipment was developed including conditioners, cooler/dryers, and related process equipment.

The early pelleting process involved mixing the feed ingredients and pelleting them with no further treatment, with the rationale being to prevent alterations to vitamins and proteins by avoiding the addition of heat to the feed. In the late 1930's, however, some processors began subjecting pellet-forming mixtures of animal feed to water and steam by passing the mixtures through a conditioner prior to introduction into the pellet extruders. The addition of steam improved production rates, reduced die wear, and improved pellet quality. Subsequently, the industry quickly adopted steam conditioning during pellet formation and this has remained an integral part of the pelleting process to date.

During steam conditioning, live steam is injected into the feed mash as it is conveyed through the conditioner which generally consists of a cylindrical tube with a rotating shaft upon which numerous paddles or picks are mounted. Meal conditioning with steam is a prerequisite for the compression of the meal or mash into pellets. Heat and water from the steam serve to activate binders in the meal particles, e.g., protein and carbohydrates, soften them and bring cohesive properties onto the surfaces of the particles. When the mash is compressed through a die, the particles are compacted and stuck together to form pellets. The condensing steam, of course, increases the temperature and moisture content of the mash. Moreover, since the steam is injected directly into the feed mash, the chemicals used to treat the boiler must be FDA approved.

The focus on research into the pelleting process since the 1960's has been on improving the steam conditioning operation, with emphasis on increasing the retention time and increasing the temperature to which the mash is conditioned. One of the more recent developments was a pressure pelleting system in which the conditioner and pelleting die cavities were pressurized, to provide for use of higher temperatures and longer conditioning times to improve pellet durability and increase the production rate. The use of increased temperatures and conditioning times, however, runs counter to the inclusion of virtually any heat sensitive or labile ingredients which may also desirable in complete animal feeds.

What is needed in the art, therefore, is a method of producing animal feed in the absence of an intentionally added heat source, such as steam, such that heat labile additives can be added to the feed. Moreover, methods and machinery that do not utilize steam injection may be more economical to operate since the methods would not require a boiler for steam production. The lack of a boiler would, in turn, remove the necessity of seeking FDA approval of certain chemical treatments of the machinery.

SUMMARY OF THE INVENTION

The present invention relates to methods of producing animal feed products, with the methods comprising mixing a binding agent with feed meal at a temperature of between about 10° C. and about 70° C. to produce a mash, passing the mash through an extruder to form an animal feed product, and drying the animal feed product. In certain embodiments, the temperature of the meal, mash and final product is kept at 70° C. or below.

The present invention also relates to animal feed products that are produced using the methods of the present invention.

DETAILED DESCRIPTION

The present invention relates to methods of producing animal feed products. As used herein, an animal feed product is a food product or a treat for animals, in particular mammals. The feed products can be for dogs, cats and livestock, such as, but not limited to, cows, pigs, horses, oxen etc. In a specific embodiment, the feed product is for a domestic pet, such as a dog or cat.

The feed products produced by the methods of the present invention can be any shape desirable, as the invention is not dependent upon or limited by the shape of the feed product. For example, the feed may be solid or hollow pellets. The feed may also be other shapes, such as strips that resemble strips of bacon or fried tortilla chips. As used herein, a food product in the shape of a "strip" is used to mean a flat food product, in any shape, such but not limited to a triangle, a rectangle, a square or circle.

The feed products are comprised of a feed meal mixed with a liquid binder. Any feed meal that is used in the animal feed industry can be used for the purposes of the present invention. Examples of components of feed meal that may, but not necessarily, be present in the feed meal used in the present invention include, but are not limited to, corn, ground corn, corn meal, rice, wheat, wheat midds, barley, oats, other plant fibers, soy, soybean meal, all grain meals from biofuel production, whey, whey meal, casein, eggs, cottonseed meal, animal fat, vegetable oil, fish oil, poultry meal, beef, pork, peanut hulls, orange rinds, beet pulp and sorghum. Examples of components of feed meal additives may include but not limited to hygroscopic solutes or ingredients, such as salts, sugars and oligosacharides, sugar alcohols, propylene glycol, syrups, free amino acids, and hydrolyzed proteinaceous materials (e.g., chicken meat, liver, wheat gluten, casein, etc) or hydrolyzed carbohydrate polymers (e.g., starches, gums, flours, fibers and chitosan). In specific embodiments, the meal comprises about 40% to about 70% cracked corn, about 10% to about 30% soybean meal, about 1% to about 30% poultry meal and 1%-30% peanut hulls, with the remaining portion, if any, being comprised of various feed meal components, such as, but not limited to, animal fat.

The methods comprise the use of a binding agent that is added to the feed meal. A binding agent in the present invention can be a polysaccharide, a gum or a soy protein binder. Specific examples of binding agents include, but are not limited to sodium alginate, gum arabic, sodium carboxymethyl cellulose, guar gum, xanthan gum, maltodextrin and pregelatinized starch.

In general, the binding agents are in dry powder form and water is mixed with the dry powder prior to mixing the binding agent with the meal. As used herein, a "liquid binding agent" is a binder that has been mixed with water. In one embodiment, prior to mixing with the feed meal, the liquid binding agents may have a solid content of less than 20% (w/w), i.e., have a moisture content of greater than 80%. In other specific embodiments, the liquid binding agents have a solid content of less than 18%, 16%, 14%, 12%, 10%, 9%, 8%, 7%, 6%, 5%, 4%, 3%, 2%, 1% and 0.5%, prior to mixing with the feed meal. In still other specific embodiments the liquid binding agents have a solid content of between about 18% and 16%, between about 16% and 14%, between about 14% and 12%, between about 12% and 10%, between about 10% and 9%, between about 9% and 8%, between about 8% and 7%, between about 7% and 6%, between about 6% and 5%, between about 5% and 4%, between about 4% and 3%, between about 3% and 2%, between about 2% and 1% and between about 1% and 0.5%, prior to mixing with the feed meal. The mixing of the water with the dry form of binder can be at any temperature where the dry binder and water are adequately mixed. In one embodiment, the water and powder binding agent are mixed at a temperature of about 17° C. to about 26° C., i.e., room temperature. In one specific embodiment, the liquid binder is in the form of a gel, after adequate mixing.

In the methods of the present invention, the feed meal is mixed with the binding agent at a temperature of between about 10° C. and about 70° C. to produce a mash. In one embodiment, the feed meal is mixed with the binding agent at a temperature of between about 17° C. to about 26° C., i.e., room temperature. The mash will have a moisture content that is provided from the moisture content of the liquid binder. In one embodiment, the moisture content of the mash is between about 5% and 70% (w/w) of the total ingredients. In a more specific embodiment, the moisture content of the mash is between about 10% and 60% (w/w) of the total ingredients. In a more specific embodiment, the moisture content of the mash is between about 20% and 40% (w/w) of the total ingredients. In an even more specific embodiment, the moisture content of the mash is between about 20% and 35% (w/w) of the total ingredients. In additional specific embodiments, the moisture content of the mash is about 20%, 21%, 22%, 23%, 24%, 25%, 27%, 28%, 29%, 30%, 31%, 32%, 33%, 34% or 35%. In still more specific embodiments, the moisture content of the mash is about between about 20% and 22%, between about 22% and 24%, between about 24% and 26%, between about 26% and 28%, between about 28% and 30%, between about 30% and 32%, between about 32% and 34% and between about 33% and 35% (w/w) of the total ingredients.

After mixing the liquid binder and the meal, the concentration of the binder (in dry form) will obviously fall. In certain embodiments, the concentration of the binder in the mash is between about 0.1% and about 10% (w/w) of the total ingredients. In another embodiment, the concentration of the binder in the mash is between about 0.1% and about 5% (w/w) of the total ingredients.

Once the binding agent and the feed meal are mixed to produce a mash, the mash is passed through an extruder to form an animal feed product. As used herein, the term extruder is used to mean a machine or apparatus that forms, shapes or re-shapes the mash. The extruder may also form, shape or re-shape the mash into smaller pieces, such as, but not limited to, pellets and strips. The extruder may simply shape the mash and optionally pass along the re-shaped mash to an additional station for further processing such as a cutting station for breaking up larger feed product pieces into smaller feed product pieces. Extrusion apparatuses for feed are well known in the art and include, but are not limited to, roller and die extruders, single screw extruders, twin screw extruders, pelletizer, expanser, and the like. Ideally, but not critically, the temperature of certain portions of the extruder should be maintained at 70° C. or below. It is possible, however, that the temperatures of certain portions of the extruder, e.g., the die, may exceed 70° C. during extrusion, which may increase the temperature of the mash of formed feed product. In these instances, it is the extrusion process itself that is increasing the temperature of the mash or feed product and not the intentional addition of external heat, such as steam injection or the like. Accordingly, one embodiment of the present invention relates to methods of forming animal feed in the absence of an intentionally applied heat source, such as steam, that will raise the temperature of the meal, mash or formed feed product to a temperature of greater than 70° C. Air may or may not be injected into the extruder during extrusion to affect feed density.

After passing through the extruder, the formed animal feed product is dried. In general, the formed feed product is dried at temperatures of less than or equal to 70° C. In one specific embodiment, the formed feed product is dried at a temperature of about 60° C. The feed product may be dried at ambient temperature, without the air of a drying apparatus. Alternatively, the feed product may be dried using a drying apparatus such as, but not limited to, a gas or electric oven or a microwave oven. One of skill in the art can set drying conditions, such as time, temperature or power (in the case of a microwave oven) to dry the formed feed product.

The present invention also relates to animal feed products that are produced using the methods of the present invention. The feed products may be hollow or solid pellets or they may be in any other shape. In one embodiment, the final feed product has a moisture content of between about 0.01% to about 35% which covers both dry and intermediate moisture range. In another embodiment, the final feed product has a density of between about 5 lbs/ft$^3$ to about 40 lbs/ft$^3$. In a more specific embodiment, the final feed product has a density of between about 20 lbs/ft$^3$ to about 30 lbs/ft$^3$. The feed product may also have a specified water activity ($a_w$) at a specified temperature and humidity. "Water activity" is well-known in the art and is generally defined as the vapor pressure directly above a sample, in this case the feed, divided by the vapor pressure of pure water at the same temperature. For example, the feed products of the present invention may exhibit an $a_w$ ranging from about 0.2 to about 0.9 at 24° C. and at varying relative humidities. The $a_w$ is, of course, a measure of the relative water vapor pressure of the feed products or the Relative Humidity of the environment at which the feed products of the present invention have reached an equilibration.

The methods of the present invention result in feed products where starch, if present, is not gelatinized. The feed products need not be completely free of gelatinized starch, if starch is present. In certain embodiments, the levels of gelatinized starch in the final feed product, if starch is present, are less than 30%. In another embodiment, the levels of gelatinized starch in the final feed product, if starch is present, are less than 20%. In yet another embodiment, the levels of gelatinized starch in the final feed product, if starch is present, are less than 10%. In still more embodiments, the levels of gelatinized starch in the final feed product are less than 9%, than 8%, than 7%, than 6%, than 5%, than 4%, than 3%, than 2% or than 1%. The degree of gelatinization in starch can be analyzed in a variety of ways known to one of skill in the art. For example, differential scanning calorimetry (DSC) can be used to assess levels of gelatinized starch in the feed products. The DSC techniques can assess gelatinization onset transition temperature ($T_o$), peak gelatinization temperature ($T_p$) and gelatinization enthalpy ($\Delta H$) of the feed products. A quick comparison of $T_o$, $T_p$ and/or $\Delta H$ of the feed products of the present invention to unprocessed mixtures of the same formulas can provide a degree of gelatinization of the feed products.

The animal feed products produced by the methods of the present invention also display excellent durability. Durability is a simple measurement and is, generally speaking, the percentage of mass of pellets that pass through a specific sieve after mixing in a blender. For example, 100 g of the feed product can be placed in a blender and blended at, for example, a "stir" speed setting for 10 minutes. The blended pellets or feed products can then be passed through, for example a 4-mesh screen, and the remaining mass of pellets after sieving can be determined. The durability would be the mass remaining divided by the mass of the starting material.

In addition, the animal feed products may comprise additional components beyond the meal and the liquid binding agent. Additional components include but are not limited to inert ingredients such as leavening agents, fillers, preservatives, flavorants, palatants, processing aids, etc.

SPECIFIC EMBODIMENTS OF THE INVENTION

The examples provided herein are meant to illustrate select embodiments of the subject matter of the present invention and are not intended to limit the scope of the present invention.

Examples

Example 1

A dry meal was produced by combining 65% cracked corn (w/w), 20% soy meal, 5% poultry meal and 10% peanut hulls and mixing at room temperature for about 10-15 minutes. A liquid binder was separately prepared by mixing 29.25 lbs water with 0.75 lbs of sodium alginate powder. The water and powder binder was mixed at room temperature until the powder was dissolved and the binder became a homogenous gel (~2.5 hours).

The liquid binder (30 lbs total) and the mixed meal (100 lbs total) were mixed together at room temperature for about 15-20 minutes to produce the mash. The moisture content of the mash at this point was about 22.5% (29.25 lbs water/130 lbs total ingredients). Moisture levels of the mash can be adjusted by addition of water during formation of the liquid binder and/or during the formation of the mash.

Example 2

A dry meal was produced by combining 60% cracked corn (w/w), 20% soy meal, 15% poultry meal and 5% peanut hulls and mixing at room temperature for about 10-15 minutes. A liquid binder was separately prepared by mixing 29.25 lbs water with 0.75 lbs of sodium alginate powder. The water and powder binder was mixed at room temperature until the powder was dissolved and the binder became a homogenous gel (~2.5 hours).

The liquid binder (30 lbs total) and the mixed meal (100 lbs total) were mixed together at room temperature for about 15-20 minutes to produce the mash. The moisture content of the mash at this point was about 22.5% (29.25 lbs water/130 lbs total ingredients). Moisture levels of the mash can be adjusted by addition of water during formation of the liquid binder and/or during the formation of the mash.

Example 3

The mixed mash in Example 1, adjusted to a moisture rate of about 30%, was extruded through a twin screw extruder (TX-52, Wenger) at a feed rate of about 80 k/hour and feed screw speed of about 18 rpm and a temperature of about 25° C. in all barrels. The two dies used in the extruder were 7.9 mm in diameter with three holes and with pins of 6.4 mm in diameter. The extruding screw speed was about 200 rpm. At this speed and at a moisture level of about 30%, the temperature of the head of the extruder increased to about 63° C. without the addition of any external heat source.

Example 4

The mixed mash in Example 2, adjusted to a moisture rate of about 35%, was extruded through a twin screw extruder (TX-52) at a feed rate of about 80 kg/hour and feed screw speed of about 200 rpm and a temperature of less than 58° C. in all barrels. The two dies used in the extruder were 7.9 mm in diameter with three holes and with pins of 2.2 mm in diameter. At this speed and at a moisture level of about 25%, the temperature of the head of the extruder was kept at or below 60° C. without the addition of any external heat source.

The pellets were dried at a temperature of about 60° C. for about 65 minutes. The hollow pellets produced in this example had a density of about 30 lbs/ft$^3$ to about 32 lbs/ft$^3$, and had a water activity of about 0.25. The pellets did not appear to contain any gelatinized starch.

What is claimed is:

1. A method comprising
    a) mixing a liquid binding agent with feed meal at a temperature of between about 10° C. and about 70° C. to produce a feed mash,
    b) passing the mash through an extruder to form an animal feed product, and
    c) drying the animal feed product
    wherein the concentration of liquid binding agent in the mash is between about 0.1% and about 10% (w/w) of the total ingredients,
    wherein the liquid binding agent has a solid content of less than 20% (w/w),
    wherein the liquid binding agent is selected from the group consisting of sodium alginate, gum arabic, sodium carboxymethyl cellulose, guar gum, xanthan gum, maltodextrin, pregelatinized starch and a soy protein binder,
    and wherein the moisture content of the mash is between about 5% and about 70% (w/w) of the total ingredients.

2. The method of claim 1, wherein the extruder is a pelletizer to form animal feed pellets.

3. The method of claim 2, wherein the pellets are hollow.

4. The method of claim 1, wherein the extruder is a press to form animal feed strips.

5. The method of claim 1, wherein the moisture content of the mash is between about 10% and about 60% (w/w) of the total ingredients.

6. The method of claim 1, wherein the moisture content of the mash is between about 20% and about 40% (w/w) of the total ingredients.

7. The method of claim 1, wherein the concentration of liquid binding agent in the mash is between about 0.1% and about 5% (w/w) of the total ingredients.

8. The method of claim 1, wherein the liquid binding agent and the feed meal is mixed at a temperature of between about 17° C. and about 26° C.

9. The method of claim 1, wherein the temperature of the extruder is at a temperature of between about 10° C. and about 70° C., prior to the passing of the mash through the extruder.

10. The method of claim 1, wherein the extruded animal feed product is dried at a temperature of less than about 70° C.

11. The method of claim 1, wherein the feed meal comprises corn, soy meal, poultry meal and peanut hulls.

12. The method of claim 11, wherein the feed meal further comprises hygroscopic components.

13. The method of claim 11, wherein the feed meal further comprises a leavening agent.

14. An animal feed product produced by the method of claim 1.

15. The animal feed product of claim 14, wherein the animal feed product comprises corn, soy meal, poultry meal and peanut hulls.

16. The animal feed product of claim 14, wherein the animal feed product has a final moisture content of between about 0.01% and 35%, $a_w$ of 0.20-0.90, and wherein the animal feed product has a density of between about 5 lbs/ft$^3$ to about 40 lbs/ft$^3$.

17. An animal treat produced by the method of claim 1.

* * * * *